INVENTOR.
William E. Bradley
by his Attorneys
Howson & Howson

Patented Nov. 11, 1947

2,430,664

UNITED STATES PATENT OFFICE 2,430,664

MEASURING APPARATUS FOR ULTRA HIGH FREQUENCY ENERGY

William E. Bradley, Swarthmore, Pa., assignor, by mesne assignments, to Philco Corporation, Philadelphia, Pa., a corporation of Pennsylvania Application December 31, 1943, Serial No. 516,504

5 Claims. (Cl. 171—95)

This invention relates to apparatus for measuring the field strength of high frequency radiant energy and, more especially, apparatus of that character which is adapted for use where the frequencies are extremely high.

In ultra-high frequency technique it is frequently necessary to make field strength measurements and, in the past, this has entailed the use of complicated and delicate equipment, requiring a high order of skill and care, if a satisfactory degree of accuracy is to be achieved. The amount of energy that can readily be captured for measurement is always exceedingly small and its characteristics are such that the apparatus and procedure commonly employed for making similar measurements at lower frequencies are inapplicable or inadequate. Heretofore one of the simpler methods of obtaining an indication of field strength at ultra-high frequencies has involved the use of apparatus comprising a crystal detector. But experience has shown that otherwise suitable crystals vary in sensitivity from time to time and thus cause erroneous results, unless the device is calibrated before and after each use.

The principal object of the present invention is to provide a simple, compact and reliable device which is suitable for making field strength measurements at ultra-high frequencies, and which does not have to be periodically recalibrated or frequently checked to determine whether it has deviated from its initial calibration.

Other and further objects will subsequently become apparent by reference to the following description taken in connection with the accompanying drawing, wherein Fig. 1 is a vertical sectional view illustrating one of the preferred embodiments of the invention;

Figure 1:
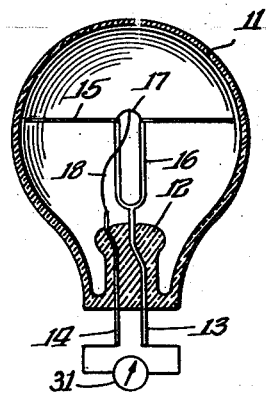

The device of Fig. 1 comprises an evacuated glass envelope 11 having a re-entrant glass stem or press 12 in which are sealed a pair of lead-in conductors 13 and 14. A dipole antenna 15 is supported upon metallic insulator 16 which, in turn, is secured to the end of conductor 13. Antenna 15 comprises two wires disposed on a common axis in end-to-end spaced relation. Each of the two portions of the dipole antenna 15 is mounted upon a leg of the U-shaped metallic insulator 16 which, if desired, may actually constitute an integral part of the wire which forms the two portions of the dipole itself. The supporting structure 16 functions as an insulator by virtue of the fact that the length thereof is substantially equal to an odd multiple of one quarter wave length of the frequency to which the dipole antenna 15 is resonant.

Dipole antenna 15 and insulator support 16 may be formed of constantan wire. A relatively fine constantan wire 17 interconnects the adjacent ends of the dipole antenna. The lead-in conductor 14 is connected to a wire 18 of different material, such as copper or chromel, which is joined to the midpoint of the fine constantan wire 17. The midpoint of the constantan wire 17 is positioned at the point of maximum current intensity when the dipole antenna 15 is properly oriented with respect to a high frequency field. The junction between the fine constantan wire 17 and the chromel wire 18, therefore, constitutes a thermocouple positioned at the maximum current intensity point of the antenna. The thermocouple being connected to the lead-in conductors 13 and 14 may be connected to a suitable direct current instrument such as a microammeter or millivoltmeter 31. If desired, the dipole antenna 15 and the quarter wave support stub 16 may be formed of iron and the thin wire 17 also may be formed of iron. The other wire 18 then might be of other material such as constantan.

While the apparatus shown in Fig. 1 preferably is enclosed within an evacuated glass envelope 11, such apparatus will operate in air, but its sensitivity will be only about one-third of that obtained by the use of an evacuated envelope. It has been found that when the antenna and thermocouple are enclosed in an evacuated envelope the relationship between input power to the dipole antenna 15 and the heat generated at the thermocouple is substantially linear; and further, that the relationship between the heat generated and the temperature rise of the metal is also substantially linear except for the negligible non-linearity due to radiation. The heat losses up to temperatures in the vicinity of 200° C. are mostly by conduction, and above that temperature range are mostly by radiation. The relationship between the temperature rise of the metal and the electromotive force output across the terminals 13 and 14 is also substantially linear over the normal operating range.

Due to unavoidable variations in manufacture there will be variations in the sensitivity of the apparatus described. The apparatus provides a satisfactory performance when used within a range of approximately ±5% of the resonant frequency of the dipole antenna. Because of the variations in manufacture it is necessary to calibrate the individual vacuum thermocouples, and this is accomplished by using a known output of a calibrated velocity modulated signal generator at a known distance from a dipole antenna connected thereto. The antenna 15 is positioned a known distance from the dipole radiating antenna and the voltage output of the vacuum thermocouple is measured. This voltage output obtained from the vacuum thermocouple is then compared to the known output of the dipole radiating antenna at that distance. It has been found that calibrations obtained in this manner are reliable provided the output of the dipole vacuum thermocouple apparatus does not exceed 10 millivolts.

The dipole structure of the vacuum thermocouple is arranged so as to be substantially normal to the path of the microwaves and parallel to the plane of polarization thereof to assure maximum sensitivity. In order to obtain an indication of even smaller amounts of such radiated energy it is possible to utilize a reflector in back of the vacuum thermocouple device.

In order to cause the device to respond to a wider band of frequencies it sometimes is desirable to employ a dipole having specially shaped conductors, preferably of conical or sectoral shape. Such a dipole antenna has been utilized in constructing the device shown in Figs. 2 and 3. Preferably the device is also enclosed within an evacuated glass envelope 19 provided with the usual re-entrant stem 21 which contains the sealed lead-in conductors 22 and 23. The conductor 23 is connected to a quarter wave stub 24 which presents an open-circuit condition at its outer ends. The quarter wave stub 24 supports the equivalent of a plurality of dipole antennas formed of two sectors 25 and 26. The arcuate end surfaces are effective in either reducing over-all size of the dipole for a given frequency, or with a slight increase in length, may substantially widen the frequency response of the device. The inner adjacent portions of the dipole sectors 25 and 26 are interconnected by a relatively small fine wire 29, such as iron or constantan. The iron or constantan wire 29 is joined at its center by a wire 30 of different material, such as constantan or copper, respectively. The wire 30 is secured to the lead-in conductor 23, so that the direct current voltage generated by the thermocouple junction at the center of the wire 29 may be used to produce an indication on a suitable sensitive direct current electrical instrument. The thermocouple junction again is positioned at a high current point in the antenna array so as to receive the maximum heating effect of the energy collected by the dipole antenna sectors 25 and 26.

Figure 2:
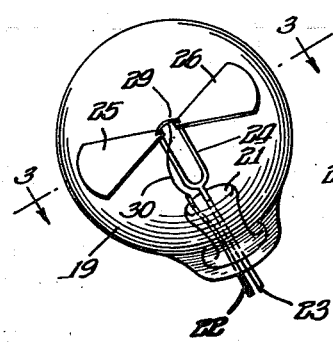
Fig. 2 is a perspective view illustrating another embodiment.
Figure 3:
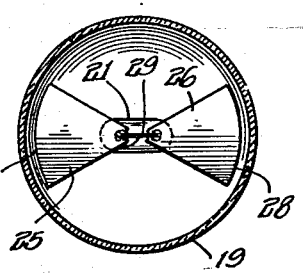
Fig. 3 is a cross-sectional view taken along line 3—3 of Fig. 2.
Figure 4:
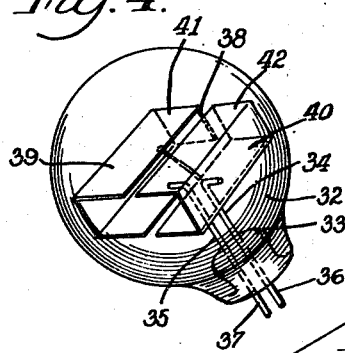
Fig. 4 is a perspective view illustrating still another embodiment of the invention.
Figure 5:
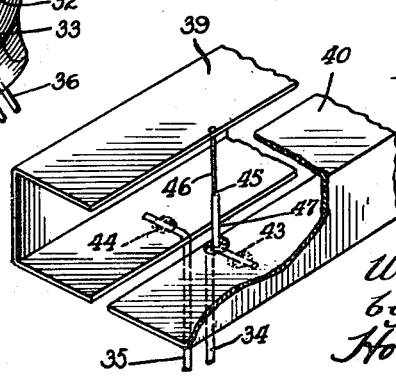
Fig. 5 is a fragmentary perspective view of the internal parts of the device of Fig. 4.

In Figs. 4 and 5 there is illustrated a field-strength measuring device which is broadly similar to the devices of Figs. 1–3, but differing thereupon principally in that a section of rectangular wave guide is employed instead of a dipole antenna. The structure of Fig. 4 comprises an evacuated glass envelope 32 having a re-entrant stem 33 which supports two wire rods 34 and 35 which are respectively connected to outside conductor leads 36 and 37. The wire rods 34 and 35 adjacent their upper extremities are each turned at right angles so that they may be suitably secured to the two halves of a split wave guide stub 38. The wave guide stub 38 comprises two channel-shaped members 39 and 40 each having one open end and each having one closed end 41 and 42, respectively. The edges of the channels are placed closely adjacent each other but for purpose of illustration in the drawing this separation has been exaggerated.

By reference to the detailed view shown in Fig. 5, it will be seen that the upper ends of the supporting rods or wires 34 and 35 are each turned at right angles so that by spot-welding or soldering at points 43 and 44 the two halves 39 and 40 of the wave guide chamber are supported closely adjacent each other. A thermocouple junction 45 is positioned midway between the upper and lower surfaces of the wave guide and this junction is formed at the point where the constantan wire 46 joins a copper plated wire 47. The constantan wire is secured to the upper surface of one section of the wave guide, as, for example, the upper surface of the wave guide section 39. The other end of the wire, such as the copper plated section 47, is secured to the bottom surface of the other wave guide section 40. The supporting structures 34 and 35 therefore also serve as electric conductors from the ends of the wires 46 and 47 so that the direct current generated by the thermocouple junction 45 may be caused to produce an indication on a suitable direct current instrument connected to the conductors 36 and 37. To utilize the device shown in Figs. 4 and 5 the open end of the wave guide 38 is arranged normal to the wave front and the upper and lower surfaces of the wave guide are arranged substantially parallel to the field of the wave which is to be received.

From the above description and the accompanying disclosure it will be seen that there has been provided apparatus suitable for use in measuring the field strength at ultra-high radio frequencies and for use in determining resonance in oscillators and transmitters. Other uses, of course, readily become apparent, since the devices may be used to determine standing wave ratios, obtain an indication of modulation, explore coupling devices in tank circuits, and to determine the conditions existing in transmission lines and wave guides. The device is preferably used in a range ±5% of its resonant frequency.

While for the purpose of illustration and explanation various devices have each been shown in a particular embodiment, it is to be understood that alterations may be made in any and each of such devices as may be commensurate with the scope of the invention as defined in the appended claims.

I claim:

1. In an apparatus for measuring the field strength of ultra-high frequency radiant energy, the combination comprising a split half wave dipole antenna supported by a quarter wave stub, a thermocouple having its hot junction positioned between and connected conductively to the two inner ends of said split dipole antenna, an evacuated envelope housing said antenna and said thermocouple, and a pair of conductors connected to said thermocouple and extending through the wall of said envelope to the exterior thereof, said conductors being positioned substantially perpendicularly to the dipole antenna.

2. In an apparatus for measuring the field strength of high frequency radiant energy, the combination comprising an evacuated envelope, wave receiving means within said envelope, said means being substantially resonant to the frequency of the radiant energy to be measured, a thermocouple within said envelope, said thermocouple including a hot junction situated on the wave receiving means at a point of maximum high-frequency current and arranged to be heated by said high frequency current derived from said wave receiving means, an indicating instrument responsive to direct current voltage generated by said thermocouple, and means interconnecting said instrument and thermocouple, said interconnecting means being positioned substantially perpendicularly to the wave-receiving means.

3. In an apparatus for measuring the field strength of high frequency radiant energy, the combination comprising an evacuated envelope, a dipole antenna within said envelope, said antenna being substantially resonant to the frequency of the radiant energy to be measured, a thermocouple within said envelope and comprising a hot junction included in said antenna at a high current point thereof, an indicating instrument responsive to direct current voltage generated by said thermocouple, and a direct current path interconnecting said instrument and thermocouple, said interconnecting means being positioned substantially perpendicularly to the wave-receiving means.

4. An apparatus for measuring field strength of high frequency radiant energy, which includes an evacuated envelope, a split dipole antenna within said envelope substantially resonant to the frequency of the energy to be measured, a fine heater wire within said envelope connecting the two inner ends of the dipole, a thermocouple within said envelope having its hot junction located on the fine heater wire, a direct current indicating instrument outside said envelope, and leads connecting said hot junction with said indicating instrument, said leads within the envelope being substantially perpendicular to the dipole antenna.

5. Apparatus according to claim 2, wherein said wave receiving means is in the form of a split dipole antenna array comprising two substantially arcuate metal sectors.

WILLIAM E. BRADLEY.

REFERENCES CITED

The following references are of record in the file of this patent:

UNITED STATES PATENTS

| Number | Name | Date |
|---|---|---|
| 1,750,326 | Nyman | Mar. 11, 1930 |
| 2,199,247 | Rich et al. | Apr. 30, 1940 |
| 2,238,298 | Wehrlin | Apr. 15, 1941 |
| 2,284,379 | Dow | May 26, 1942 |
| 2,170,028 | Kohl | Aug. 22, 1939 |
| 1,962,565 | Lakhovsky | June 12, 1934 |
| 2,153,181 | Gerhard et al. | Apr. 4, 1939 |
| 2,166,124 | Breyer | July 18, 1939 |
| 2,365,207 | Moles | Dec. 19, 1944 |
| 2,313,513 | Brown | Mar. 9, 1943 |
| 1,966,491 | Ferrell | July 17, 1934 |

FOREIGN PATENTS

| Number | Country | Date |
|---|---|---|
| 546,505 | Great Britain | Feb. 16, 1942 |